United States Patent [19]

Doi

[11] Patent Number: 5,029,825
[45] Date of Patent: Jul. 9, 1991

[54] FLUID FILLED ENGINE MOUNT

[75] Inventor: Kazuhiro Doi, Yokohama, Japan

[73] Assignee: Nissan Motor Co., Ltd., Yokohama, Japan

[21] Appl. No.: 420,250

[22] Filed: Oct. 11, 1989

[30] Foreign Application Priority Data

Oct. 11, 1988 [JP] Japan .................. 63-132411

[51] Int. Cl.⁵ .............................................. F16F 9/00
[52] U.S. Cl. .................................. 267/140.1; 267/219
[58] Field of Search ............ 267/140.1 AE, 140.1 E, 267/140.1 C, 140.1 R, 219, 220, 35, 141; 248/636, 562; 188/267

[56] References Cited

U.S. PATENT DOCUMENTS

| 4,583,723 | 4/1986 | Ozawa | 188/257 |
| 4,650,170 | 3/1987 | Fukushima | 267/219 |
| 4,720,087 | 1/1988 | Duclos et al. | 267/140.1 AE |
| 4,742,998 | 5/1988 | Schubert | 267/136 |
| 4,759,534 | 7/1988 | Hartel | 267/140.1 AE |
| 4,861,006 | 8/1984 | Takano et al. | 267/140.1 AE |

FOREIGN PATENT DOCUMENTS 57-84220 5/1982 Japan .
60-104828 6/1985 Japan .

Primary Examiner—Matthew C. Graham
Attorney, Agent, or Firm—Foley & Lardner

[57] ABSTRACT

An ERF filled engine mount includes a main working chamber and first and second auxiliary chambers. Orifice passages in which electrodes are disposed, fluidly connect the main working chamber with the first auxiliary chamber. A gutter is defined by a casing in which a movable member is disposed. This member is arranged to be moved (vibrated) by the pressure changes which occur in the main working chamber when the mount is subject to vibration which tend to cause cabin reverberation noise. An electrode is mounted on an electrically non-conductive portion of the casing structure and arranged to cooperate with a conductive portion thereof. This electrodes has a voltage impressed thereon during engine idle and shake modes and is de-energized when the reverberation noise inducing frequency is approached.

5 Claims, 2 Drawing Sheets

FLUID FILLED ENGINE MOUNT

BACKGROUND OF THE INVENTION

1. Field of the Invention

The present invention relates generally to an engine mount and more specifically to an engine mount which is filled with a electrorheopectic fluid.

2. Description of the Prior Art

JP-A-57-84220 discloses an ERF-filled engine mount which includes a main working chamber defined in part by an elastomeric member, an orifice arrangement which provides fluid communication between the main working chamber and an auxiliary chamber, and a movable element which is disposed in a gutter defining casing.

In this arrangement, when vibrations in relatively low frequency ranges such as those in which engine idling and engine shake occur, the movement of the slug of fluid which is contained in the orifice passage is induced in a manner which attenuates the amount of vibrational energy which is transmitted to the chassis from the power unit.

When vibration which falls in a relatively high vibrational range such as that which tends to induce reverberation noise in the vehicle cabin, is applied to the mount, the movable element is excited to undergo displacement in a manner wherein the gutter arrangement functions to attenuate the vibration and thus reduce the amount of cabin noise.

In order to derive the appropriate vibration transmission attenuation in the lower vibration ranges it necessary to ensure that the movable element does not move. In other words, when high frequency low amplitude vibration is applied, the amount of movement of the movable element should be limited to small value while when relatively large amplitude low frequency vibration is applied, the movement should be prevented.

However, this prior proposed arrangement suffers from the drawback that when the vibration applied exhibits a relatively low frequency and a relatively low amplitude, such as tends to occur during engine idling, the pressure which is developed in the main working chamber tends to escape via the gutter and reduces the required amount of fluid movement in the orifice passage.

Further, when large amplitude engine shake type vibrations are produced the pressure changes in the main working chamber are reduced by the amount which the fraction of fluid which is contained in the gutter arrangement moves and the full effect of the orifice passage or passages cannot be realized.

SUMMARY OF THE INVENTION

It is an object of the present invention to provide an engine mount of the above described type which enables the movable element to be selectively locked in place and thus enable the full benefit of the orifice passage structure to be realized.

In brief, the above object is achieved by an ERF-filled engine mount which includes a main working chamber and first and second auxiliary chambers. Orifice passages in which electrodes are disposed fluidly connect the main working chamber with the first auxiliary chamber. A gutter is defined by a casing in which a movable member is disposed. This member is arranged to be moved (vibrated) by the pressure changes which occur in the main working chamber when the mount is subject to vibration which tend to cause cabin reverberation noise. An electrode is mounted on an electrically non-conductive portion of the casing structure and arranged to cooperate with a conductive portion thereof. This electrodes has a voltage impressed thereon during engine idle and shake modes and is de-energized when the reverberation noise inducing frequency is approached.

More specifically, a first aspect of the present invention is deemed to comprise a mounting device for supporting a body subject to vibration on a base, and which features: an elastomeric body, the elastomeric body being operatively connected between the body and the base; means defining a main working chamber, the main working chamber undergoing a change in volume when a vibration is applied to the elastomeric body; means defining an auxiliary chamber, the auxiliary chamber being fluidly communicated with the main working chamber by way of an orifice passage, the main working chamber, first auxiliary chamber and the second auxiliary chamber being filled with an electrorheopectic fluid; a case, the case being fluidly interposed between the main working chamber and a second auxiliary chamber, the case including a movable element which is movable in response the pressure changes in the main working chamber, the moveable element being retained in a case which limits the amount of displacement of the movable element, the case including passage means which permits communication between the main working chamber and the second auxiliary chamber irrespective of the position of the movable element, the case having a portion which is arranged to act as an electrode and which when a voltage is impressed thereon causes the viscosity of the electrorheopectic fluid in the case to increase.

A second aspect of the invention is deemed to comprise a mounting device for supporting a body subject to vibration on a base, which mounting device features: an elastomeric body, the elastomeric body being operatively connected between the body and the base; means defining a main working chamber, the main working chamber undergoing a change in volume when a vibration is applied to the elastomeric body; means defining an auxiliary chamber, the auxiliary chamber being fluidly communicated with the main working chamber by way of first and second orifice passages, the main working chamber, first auxiliary chamber, the second auxiliary chamber and the first and second orifice passages being filled with an electrorheopectic fluid; first and second electrodes, the first and second electrodes being disposed in a spaced juxtaposed relationship in the first orifice passage; third and fourth electrodes, the third and fourth electrodes being disposed in a spaced juxtaposed relationship in the second orifice passage; a case, the case being fluidly interposed between the main working chamber and a second auxiliary chamber, the case including a movable element which is movable in response the pressure changes in the main working chamber, the moveable element being retained in a case which limits the amount of displacement of the movable element, the case including passage means which permits communication between the main working chamber and the second auxiliary chamber irrespective of the position of the movable element; and a fifth electrode, the fifth electrode being disposed in the case and on a first electrically insulated portion thereof, the case having a second portion which is electrically conductive and able to act as a sixth electrode; the second, fourth and fifth electrodes being selectively connectable with a first terminal of a source of voltage, the first, third and sixth electrodes being connected with one of a second terminal of the source of voltage and ground.

A third aspect of the present invention is deemed to comprise a vibration damping device which features: an inner tubular member; an outer tubular member, the outer tubular member being disposed coaxially about the inner tubular member; an elastomeric body, the elastomeric body disposed between the inner and outer tubular members, the elastomeric body being formed with recesses which at least in part define a main working chamber, an air chamber, first and second auxiliary chambers and a first diaphragm, the first diaphragm being arranged to separate the air chamber from the first auxiliary chamber and to be exposed to the pressure changes in the first auxiliary chamber, the main working chamber, first and second auxiliary chambers being filled with an electrorheopectic fluid; an essentially annular rigid electrically non-conductive insert member disposed about the periphery of the elastomeric member and arranged to juxtapose the inner periphery of the outer tubular member; an elastomeric layer, the elastomeric layer being disposed on the inner peripheral surface of the outer tubular member, a portion of the elastomeric layer defining a second diaphragm which is exposed to the second auxiliary chamber; first and second orifice passages formed in the insert member, the first and second orifice passages being arranged to fluidly communicate the main working chamber and the first auxiliary chamber; a casing, the casing being disposed in an opening formed in the insert member which communicates the main working chamber with the second auxiliary chamber, the casing closing the opening in a manner to act as a partition which separates the main and auxiliary chambers, the casing having a first electrically conductive portion and a second electrically non-conductive portion; a movable member, the movable member being disposed in the casing and movable in responsive to pressure changes which are induced in the main working chamber; first and second electrodes, the first and second electrodes being disposed in the first orifice passage; second and third electrodes, the second and third electrodes being disposed in the second orifice passage; and a fifth electrode, the fifth electrode being disposed in the casing and on the electrically non-conductive portion thereof, so as to be located opposite the electrically conductive portion which acts as a sixth electrode.

DETAILED DESCRIPTION OF THE PREFERRED EMBODIMENTS

Figure 1:
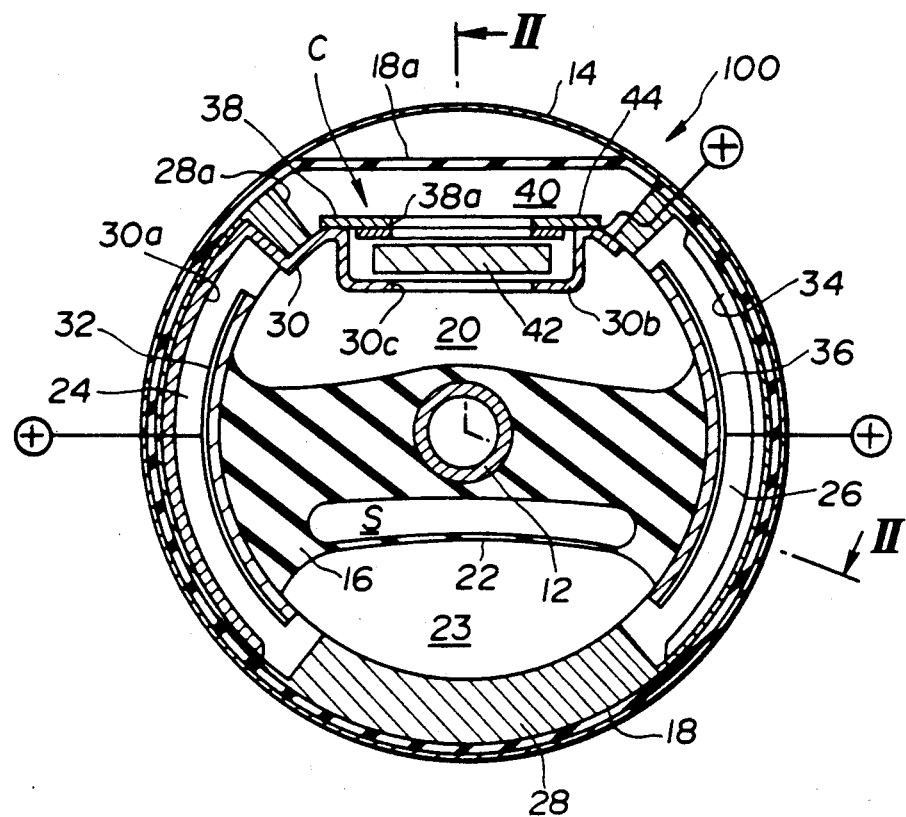
FIG. 1 is a sectional elevation of an embodiment of the present invention.
Figure 2:
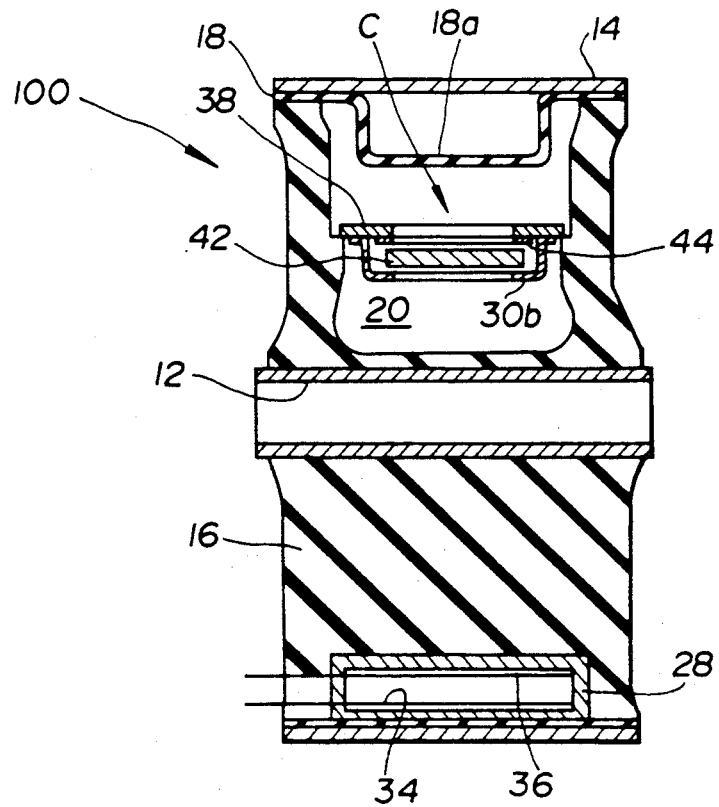
FIG. 2 is a sectional view as taken along section lines II—II of FIG. 1.

FIGS. 1 and 2 show an embodiment of the present invention. In this arrangement an engine mount 100 is comprised of an inner cylindrical member 12, an outer cylindrical member 14 and an elastomeric body 16 which is disposed between the two members 12 and 14 and fixedly connected to the inner member 12 by way of vulcanizing or the like.

The inner member 12 in this instance is arranged to be connected to one of the power unit (viz., the engine and transmission unit) and the vehicle chassis, while the outer member 14 is arranged to be connected to the other of the two. With this connection arrangement the elastomeric body 16 supports the power unit on the chassis.

An elastomeric layer 18 is disposed about the outer periphery of the elastomeric body 16 which is then force fitted into the outer cylindrical member 14.

The elastomeric body 16 is formed with cavities which, in combination with an essentially annular-shaped insert 28, which disposed with the elastomeric body 16 and within the outer cylindrical member 14 and elastomeric layer 18, define a main working chamber 20 and a first auxiliary chamber 23.

As best seen in FIG. 1 the elastomeric body 16 is also formed with a cavity which defines an air chamber S which is separated from the auxiliary chamber 23 by a flexible diaphragm 22.

Arcuate orifice passages 24, 26 which, in this case, have essentially rectangular cross-sections, are defined in the annular insert 28 and arranged to provide fluid communication between the main and auxiliary chambers 20, 23. In this case the annular member 28 is formed of an electrically non-conductive material and has an opening 28a formed therein. The mouth of this opening 28a is closed by an electrically conductive member 30 which forms the lower portion of a casing arrangement C in which a so called "gutter" is defined.

The electrically conductive member 30 includes an integral elongate arcuately curved leg portion 30a which is disposed along the outer wall of the first orifice passage 24 and is arranged to act as a first electrode. A second electrode 32 is disposed opposite the leg portion 30a and along the inner wall of the orifice passage 24. As will be noted from the drawings, the electrode 32 extends completely along the inner wall from the opening which fluidly communicates with the main working chamber 20 to the opening which communicates with the first auxiliary chamber 23.

A third electrode 34 is disposed along the outer wall of the second orifice passage 26 while a fourth electrode 36 is disposed along the inner wall of the same.

The second and fourth electrodes 32, 36 are connected to a source of voltage, in this instance the positive terminal (merely by way of example) by lead lines which are suitably disposed through one axial end of the device (see FIG. 2). The electrodes 30a, 34 which are disposed along the outer walls of the orifice passages 24, 26 are connected with ground via lead line which are also disposed through the same axial end of the mount 100.

An upper electrically non-conductive member 38 is disposed on top of a dished portion 30b of the member 30 which closes the mouth of the opening formed in the insert, in a manner to complete the casing C and the partition which separates the main working chamber 20 from a second auxiliary chamber 40. The second auxiliary chamber 40 is defined in a cavity formed in the elastomeric body 16 and by a portion of the elastomeric layer 18a which is arranged to act as a diaphragm.

The upper and dished portions 38, 30b of member 30 are formed with apertures 38a, 30c respectively, which provide communication between the main and second auxiliary chambers 20, 40 and thus defines the above mentioned gutter.

A puck-like movable member 42 is disposed within the casing C. This member 42 has major surfaces which are larger than the openings 38a, 30c formed respectively in the upper member 38 and the dished portion 30b of member 30.

A fifth electrode 44 is disposed on the inner face of the upper member 38 and arranged to surround the opening 38a formed therein. This electrode 44 is connected by way of lead line to the same terminal (positive) as the second and fourth electrodes. As will be appreciated, due to its inherent grounding, the dished portion 30b acts as a complementary electrode (sixth electrode) for the fifth one 44.

The clearance in which the puck-like movable element 42 is free to move within the casing C is, in the instant embodiment, set between 0.1 and 0.3 mm and therefore slightly larger than the amplitude of the high frequency vibrations which tend to induce cabin reverberation noise.

In this embodiment the chambers and passages of the mount 100 are filled with an ERF (viz., an electrorheopectic fluid which undergoes an increase in viscosity when exposed to electrodes across which a high voltage is impressed). The orifice passages 24, 26 in this case are designed and dimensioned with respect to the expansion spring characteristics of the portion of the elastomeric body 16 which defines the main working chamber 20, so that the mass of the slugs of EBF which is contained therein exhibit a resonance frequency which falls in the 35-50 Hz region. Viz., in a region which spans a secondary vibration frequency in the order of 20-30 Hz which is produced by an engine idling between 600-900 RPM and which enables the device to be tuned in a manner wherein the dynamic spring constant is reduced in the manner illustrated by trace A in FIG. 3.

Under normal circumstances, the spring constant of the elastomeric body 16 is set so that the above mentioned expansion spring characteristics fall in a range of 10-15 Kg/mm, the diameter of the device is 100 mm and the axial length about 80 mm. In order to achieve the required resonance characteristics two orifice passages are required.

With the above described arrangement, when the power unit vibrates with respect to the vehicle chassis, the outer and inner and outer cylindrical member 14, 12 are displaced with respect to one another with the result that the elastomeric body 16 is subject to distortion. This distortion induces a change in the volume of the main working chamber 20 with the result that ERF is displaced between the main working chamber 20 and the first auxiliary chamber 23 by way of the orifice passages 24, 26 and the second auxiliary chamber 40 by way of the gutter.

However, in the event that ERF is permitted to displaced simultaneously through the gutter and the two orifice passages 24, 26, due to the flow through the gutter (viz., casing C), the amount of fluid which is forced back and forth through the orifice passages 24, 26 is reduced to the point where the effect of the orifice passages is partially lost.

Accordingly, in accordance with the present invention, voltages are selectively impressed on the second, fourth and fifth electrodes in accordance with the following table.

TABLE

|  | ORIFICE ELECTRODES | GUTTER ELECTRODE |
| --- | --- | --- |
| IDLING | OFF | ON |
| SHAKE | ON | ON |
| OTHER | ON | OFF |

It will be noted that the appropriate connection between the positive terminal of the voltage source and ground becomes possible from the time the engine ignition switch assumes an ON state.

When the engine is at standstill and the engine is idling, only the gutter electrode 44 has a voltage impressed thereon. Under these conditions, the ERF contained in the casing C undergoes a marked increase in viscosity and induces a so called "stick" phenomenon wherein the movement of the puck-like member 42 is locked in position and prevented from moving.

Under these conditions, displacement of fluid from and to the main working 20 chamber occurs exclusively through the orifice chambers 24, 26 and thus during idling the vibration transmission is effectively attenuated due to the slugs of fluid in the orifice passages being appropriately excited to undergo resonance.

When the vehicle is running at a predetermined speed and the power unit tends to undergo so called "engine shake", a voltage is impressed on both the gutter electrode 44 and the electrodes 32, 36 in the orifice passages 24, 26. Under these conditions, the orifice passages 24, 26 are induced to "stick" and free movement of ERF therethrough prevented.

Figure 3:
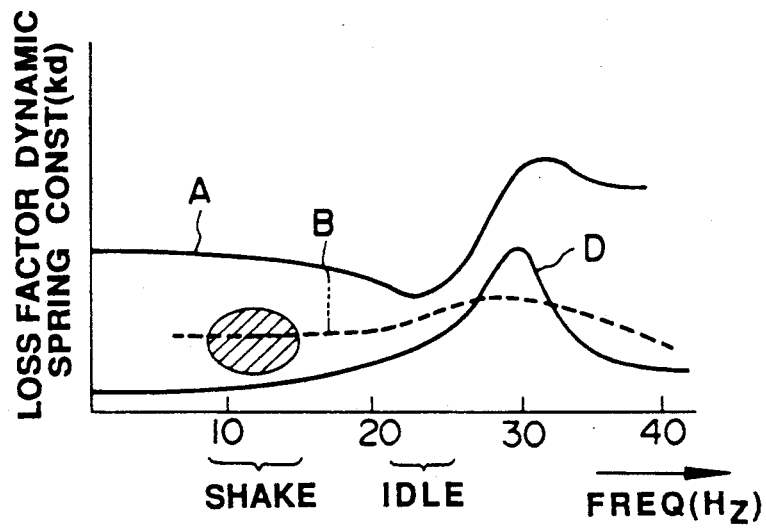
FIG. 3 is a graph which shows the dynamic spring constant and loss factor characteristics obtained with the embodiment of the present invention in a relatively low frequency vibration range.

The ERF in the main working chamber is therefore prevented from being displaced to, or inducted from, either of the auxiliary chambers 20, 40 with the result that the spring constant of the mount is increased as indicated by the chain line trace B of FIG. 3. This results in the movement of the power unit being reduced and the amount of energy which is applied to the chassis attenuated.

Figure 4:
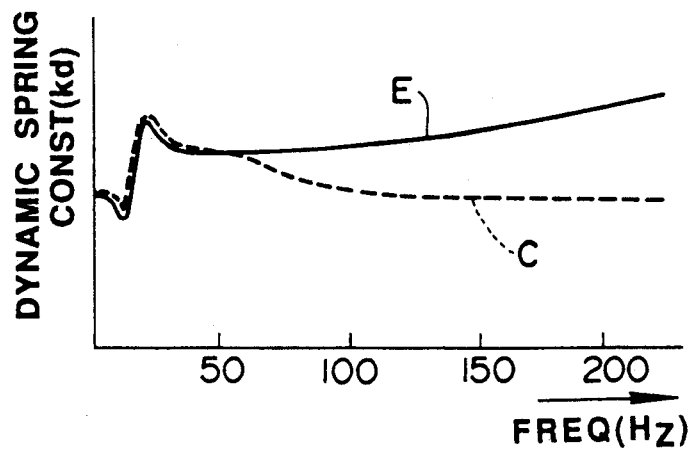
FIG. 4 is a graph which compares the dynamic spring constant characteristics obtained with the embodiment of the present invention and the above described prior art arrangement, in a relatively high frequency vibration range.

During modes of operation other than those in which engine shake and idling occur, the gutter electrode 44 is de-energized and thus communication between the main working chamber 20 and the second auxiliary chamber 40 permitted. Under these conditions the puck-like member 42 is rendered freely movable with the result that when high frequency vibrations are produced by the power unit the pressure changes in the main working chamber 20 induce the movement (vibration) of the element 42. The dynamic spring constant of the mount 100 is reduced as indicated by trace C in FIG. 4 and the generation of reverberation noise in the vehicle can is either greatly reduced or totally prevented.

It will, be noted that trace D in FIG. 3 indicates the loss factor characteristics which are achieved with the instant embodiment when the orifice electrodes are maintained in a de-energized state, while trace E denotes the dynamic spring constant characteristics which are provided by prior art type mounts of the nature discussed in opening paragraphs of the instant disclosure.

It will be appreciated that the change in viscosity of the ERF varies with the level of voltage applied whereby it is possible to vary the degree by which transmission of pressure through the orifice passages, for example, can be selectively controlled. An example of such a mode of control can be found in copending U.S. patent application Ser. No. 07/214,566 filed on July 1, 1988 in the name of Doi et al., which was issued on Apr. 3, 1990 as U.S. Pat. No. 4,913,409.

This document discloses a control arrangement which is responsive to two accelerometer type sensors which the relative velocity and the relative displacement of the vibrating body with respect to the base, to be determined. The control circuit is arranged in this case to control the voltage applied to the electrodes in a manner which sets the voltage to a low level when the relatively velocity and displacement are high and are in phase, sets the voltage to a high level while said relative displacement and relative velocity are out of phase and until the resilient force produced by the elastomeric body becomes equal to the damping force being produced, and then continuously decreases the voltage from said high level toward said low level until the resilient force becomes equal to the damping force and said relative displacement and said relative velocity come into phase. The above reference is hereby incorporated by reference thereto.

However, other modes of control are also possible. Examples of the same may be found in JP-A-60-104828 or U.S. Pat. No. 4,742,998 issued on May 10, 1988 in the name of Schubert by way of example.

What is claimed is:

1. A mounting device for supporting a body subject to vibration on a base comprising;
   an elastomeric body, said elastomeric body being operatively connected between said body and said base;
   means defining a main working chamber, said main working chamber undergoing a change in volume when a vibration is applied to said elastomeric body;
   means defining first and second auxiliary chambers, said first auxiliary chamber being fluidly communicated with said main working chamber by way of an orifice passage, said main working chamber, first auxiliary chamber and second auxiliary chamber being filled with an electrorheopectic fluid;
   a case, said case being fluidly interposed between said main working chamber and said second auxiliary chamber, said case including a movable element which is movable in response to pressure changes in said main working chamber, said case limiting the amount of displacement of the movable element, said case having a portion which is an electrode and which, when a voltage is impressed thereon, causes the viscosity of the electrorheopectic fluid in said case to increase.

2. A mounting device as claimed in claim 1 further comprising:
   means for selectively connecting said electrode to a source of voltage when the frequency of the vibration applied to said mount falls in a range in which engine idling and engine shake occur.

3. A mounting device for supporting a body subject to vibration on a base comprising;
   an elastomeric body, said elastomeric body being operatively connected between said body and said base;
   means defining a main working chamber, said main working chamber undergoing a change in volume when a vibration is applied to said elastomeric body;
   means defining first and second auxiliary chambers, said first auxiliary chamber being fluidly communicated with said main working chamber by way of first and second orifice passages, said main working chamber, first auxiliary chamber, second auxiliary chamber and said first and second orifice passages being filled with an electrorheopectic fluid;
   first and second electrodes, said first and second electrodes being disposed in a spaced juxtaposed relationship in said first orifice passage;
   third and fourth electrodes, said third and fourth electrodes being disposed in a spaced juxtaposed relationship in said second orifice passage;
   a case, said case being fluidly interposed between said main working chamber and said second auxiliary chamber, said case including a movable element which is movable in response to pressure changes in said main working chamber, said case limiting the amount of displacement of the movable element; and
   a fifth electrode, said fifth electrode being disposed in said case and on a first electrically insulated portion thereof, said case having a second portion which is electrically conductive and defines a sixth electrode;
   said second, fourth, and fifth electrodes being selectively connectable with a first terminal of a source of voltage, said first, third and sixth electrodes being connected with one of a second terminal of said source of voltage and ground.

4. A vibration damping device comprising:
   an inner tubular member;
   an outer tubular member, said outer tubular member being disposed coaxially about said inner tubular member;
   an elastomeric body, said elastomeric body disposed between said inner and outer tubular members, said elastomeric body being formed with recesses which at least in part define a main working chamber, an air chamber, first and second auxiliary chambers and a first diaphragm, the first diaphragm being arranged to separate the air chamber from the first auxiliary chamber and to be exposed to the pressure changes in the first auxiliary chamber, the main working chamber, first and second auxiliary chambers being filled with an electrorheopectic fluid;
   an essentially annular rigid electrically non-conductive insert member disposed about the periphery of said elastomeric member and arranged to juxtapose the inner periphery of said outer tubular member;
   an elastomeric layer, said elastomeric layer being disposed on the inner peripheral surface of said outer tubular member, a portion of said elastomeric layer defining a second diaphragm which is exposed to the second auxiliary chamber;
   first and second orifice passages formed in said insert member, the first and second orifice passages being arranged to fluidly communicate the main working chamber and the first auxiliary chamber;
   a casing, said casing being disposed in an opening formed in said insert member which communicates the main working chamber with the second auxiliary chamber, said casing closing the opening in a manner to act as a partition which separates the main chamber and second auxiliary chamber, said casing having a first electrically conductive portion and a second electrically non-conductive portion;

a movable member, said movable member being disposed in said casing and movable in responsive to pressure changes which are induced in the main working chamber;

first and second electrodes, said first and second electrodes being disposed in the first orifice passage;

second and third electrodes, said second and third electrodes being disposed in the second orifice passage; and a fifth electrode, said fifth electrode being disposed in said casing and on the electrically non-conductive portion thereof, so as to be located opposite the electrically conductive portion which acts as a sixth electrode.

5. A vibration damping device as claimed in claim 4 wherein the electrically conductive portion of said casing and said first electrode are formed integrally with one another.

* * * * *